United States Patent [19]

Jensen et al.

[11] Patent Number: 4,842,459
[45] Date of Patent: Jun. 27, 1989

[54] SUPPORT ASSEMBLY WITH RETAINER

[75] Inventors: Finn Jensen, Dolton; Rudolph E. Nadherny, Naperville, both of Ill.

[73] Assignee: Ireco, Inc., Chicago, Ill.

[21] Appl. No.: 181,748

[22] Filed: Apr. 14, 1988

[51] Int. Cl.[4] .............................................. B60R 7/00
[52] U.S. Cl. ..................................... 410/97; 410/130; 248/58; 248/75
[58] Field of Search ....................... 410/47, 48, 49, 50, 410/53, 54, 55, 56, 57, 96, 97, 117, 120, 130, 150; 248/58, 75, 327; 24/115 H, 30.5 R

[56] References Cited

U.S. PATENT DOCUMENTS

| | | | |
|---|---|---|---|
| 2,752,864 | 7/1956 | McDougal et al. | 410/130 |
| 3,376,599 | 4/1968 | Singer | 410/130 |
| 4,161,145 | 7/1979 | Patterson et al. | 410/130 |
| 4,167,144 | 9/1979 | Martin et al. | 410/117 |
| 4,288,188 | 9/1981 | Smith | 410/97 |
| 4,519,564 | 5/1985 | Nadherny | 248/58 |

FOREIGN PATENT DOCUMENTS 1158412  5/1985  U.S.S.R. ............................ 410/96

OTHER PUBLICATIONS

Equipco Load Dividers, Unarco Transportation Equipment Brochure.
Load Faster, Cut Costs, Reduce Damage, Evans Brochure.

Primary Examiner—Sherman D. Basinger
Assistant Examiner—Stephen P. Avila
Attorney, Agent, or Firm—Lockwood, Alex, Fitzgibbon & Cummings

[57] ABSTRACT

A support assembly is provided that includes a plurality of inelastic, flexible cables that are joined together by a plurality of spaced apart securement members in order to form a wedging elongated eye. An end assembly of the support assembly passes through the elongated eye in one direction, after which a retaining member thereof is moved from a longitudinal, feedable orientation to a transverse, locking orientation. An especially secure engagement is provided. The support assembly is especially suitable as a safety cable for a bulkhead assembly.

19 Claims, 3 Drawing Sheets

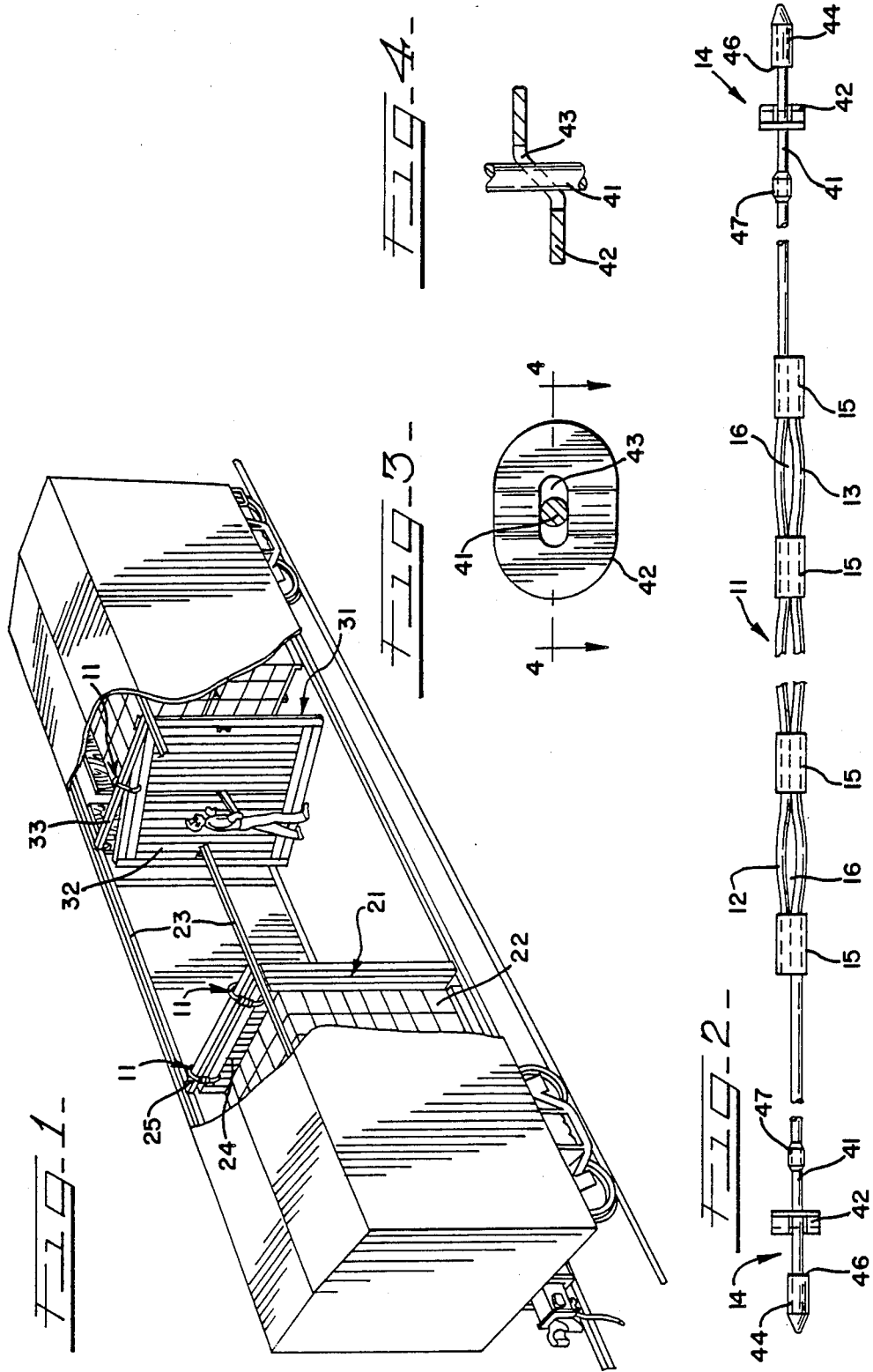

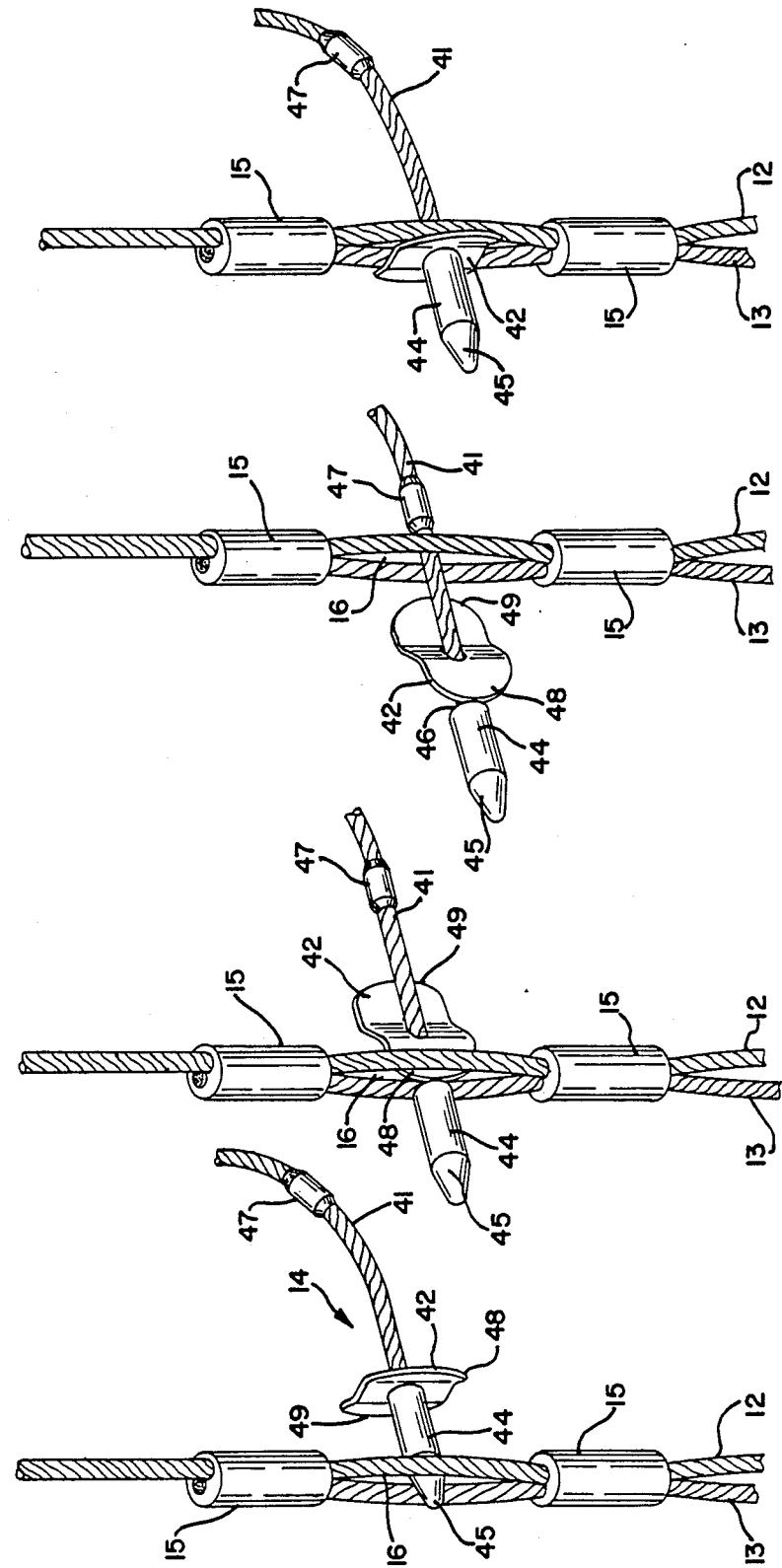

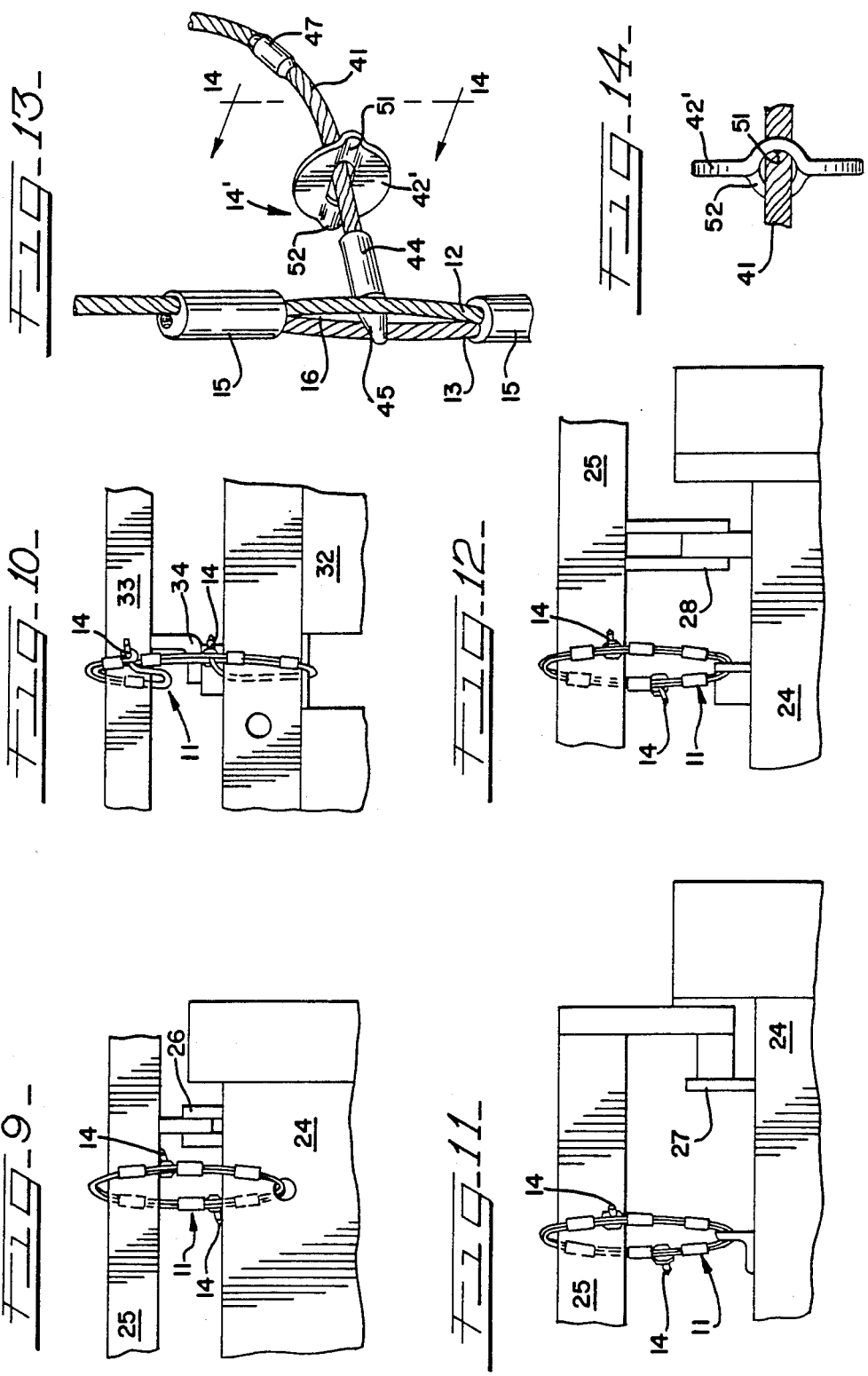

SUPPORT ASSEMBLY WITH RETAINER

BACKGROUND AND DESCRIPTION OF THE INVENTION

The present invention generally relates to an improved support assembly, more particularly to a support assembly which has a structure including a retainer member that greatly enhances the ability of the support assembly to withstand withdrawal forces, including twisting withdrawal forces. The support assembly includes a plurality of inelastic, flexible cables that are joined together by a plurality of spaced apart securement members to form an elongated eye for receiving and wedging therewithin a free end of at least one of the inelastic, flexible cables in order to complete the formation of a support loop of a desired size and configuration. The free end includes an end assembly having a rigid means securely attached onto the cable in combination with a retainer member that is slidably mounted on the cable in a manner such that the retainer member is slidable along the cable up until it engages the rigid member, and not therebeyond. The retainer member has two orientations, one which prevents passage of the end assembly through the eye, and the other of which permits, upon proper manipulation, passage of the end assembly through the eye in at least an inserting direction and preferably also in a withdrawing direction when desired.

In any number of applications, there is a need for a device for securely attaching, supporting and/or suspending one component or member with respect to another component or member, or a device for encircling a member or a plurality of members in order to function as a safety cable or the like. U.S. Pat. No. 4,519,564, the subject matter thereof being incorporated hereinto, discloses a support assembly that is capable of performing these types of functions in many different instances. In some instances, certain applications are unusually demanding in their requirements to prevent disassembly or pull-out because of the development of unusually excessive forces, especially non-longitudinal or twisting or bending forces which may tend to separate even the most secure of support assemblies.

An example of the type of application in which unusually high forces of this type are encountered are in connection with safety cables for movable bulkheads within railway cars, tractor trailers, and the like. Safety cables of this general type are utilized in order to provide adequate support for a bulkhead in the event that it inadvertently becomes detached from its supporting structures. Oftentimes, these safety cables are subjected to abusive conditions and extremely high forces due to the mass of these large bulkhead devices. When such bulkhead devices include pivotable mounts, occasions arise when inordinantly high forces can be applied to a bulkhead safety cable, especially when it is twisted around a bulkhead mounting structure after a pivotally mounted bulkhead has been rotated more than once in substantially the same direction. Under circumstances such as these, forces are developed which exert non-longitudinal stresses on the support assembly or cable. Stresses of this type have transverse directional components which tend to exert substantial prying or twisting disassembly forces that can exceed the pull-out strength of devices such as those of U.S. Pat. No. 4,519,564.

Another example of the application of a safety type of function that can be performed by these types of devices in order to provide secondary or back-up support is one in which an article is to be retained in place should it become inadvertently disconnected from its primary support. An example of an application of this variety includes safety cables and safety support assemblies for members such as a bottom rod of a railway brake mechanism, which assemblies are provided in case the bottom rod becomes disconnected from the brake lever and would otherwise fall from the railway car.

Further examples of uses which require support assemblies that are exceptionally durable include those in which one member must be suspended from another, usually more massive, member in a manner whereby the suspended member retains some freedom of movement with respect to other member. For example, an air brake hose of a railway car can be suspended from the railway car coupler by a suspension device that allows limited movement of the air brake hose in order to facilitate its connection to the remainder of the air brake mechanism while permitting the air brake hose to move as needed in order to avoid undesirable uncoupling, while still restricting movement of the hose to an extent that uncoupling is accomplished only when it is desired. Additional applications require the attachment of one article to another while providing enough flexibility and limited movement so as to retain the suspended article within an area of movement that is limited according to the particular needs of the structures involved, such as in the case of mooring lines, guide wires, hoist cables, fixture hangers, and the like. A further type of application securely and tightly affixes one member to another in order to effect fast repairs, such as affixing an exhaust pipe or the like to an undercarriage of an automobile, or in order to replace a cotter pin, or to provide seals for railway cars, tractor trailers, and the like.

In summary, the present invention is a support assembly capable of being used for the purposes discussed herein, the assembly being relatively inexpensive and easy to use and manufacture while being especially strong and capable of withstanding severe environmental conditions, if necessary. The support assembly of the present invention includes a plurality of inelastic, flexible and stiff cables and a plurality of securement members spaced along and rigidly connecting these cables in order to thereby form a stiff elongated eye. An end assembly is provided at a free end of at least one of the cables, the assembly including a rigid member securely attached to the cable, as well as a retainer member that is slidably mounted on the cable in a manner so that the retainer member is slidable along the cable up until it engages the rigid member and not therebeyond. The cables of the eye assembly are sufficiently resilient so that the eye will expand to permit passage of the end assembly therethrough when the retainer of the end assembly is in a generally longitudinally directed orientation. The end assembly and the eye also cooperate to provide extremely secure engagement or assembly when the retainer member is in a substantially transversely directed orientation. If desired, the securement or assembly thus afforded by the cooperation between the eye and the end assembly can be undone once slack is provided therebetween and by moving the retainer member to its generally longitudinally directed orientation so that it can be fed through the eye and so that it will assist in feeding the rigid member through the eye.

The user of this support assembly can thread the end assembly through a supporting aperture and/or wrap the support assembly around or between one or more supporting members and thereafter feed the end assembly through the elongated eye, after which movement of the retainer member to its generally transversely directed orientation will prevent unintentional passage of the end assembly through the eye.

It is accordingly a general object of the present invention to provide an improved support assembly for securely affixing, attaching, securing, or encircling one component with respect to another component.

Another object of the present invention is to provide an improved support assembly in the general nature of an elongated cable device which is secured to itself in a manner that prevents unintentional release from such securement.

Another object of this invention is to provide an improved support assembly that is a cable-like device which is capable of being secured to itself in an especially secure manner while possessing the ability to be unsecured when desired.

Another object of this invention is to provide a support assembly that is particularly useful in functioning as a safety cable device for the mounting means of bulkheads within railway cars, tractor trailers, or the like.

Another object of this invention is to provide an improved assembly for supporting, suspending or encircling in a manner that is especially secure while still providing the ability to disassemble the apparatus when desired.

These and other objects, features and advantages of this invention will be clearly understood through a consideration of the followed detailed description.

BRIEF DESCRIPTION OF THE DRAWINGS

In the course of this description, reference will be made to the attached drawings, wherein:

FIG. 1 is a perspective view of the support assembly according to the present invention illustrated in use as a safety cable for bulkheads of a railway car;

FIG. 2 is an elevational view, partially broken away, of the support and retainer assembly according to this invention;

FIG. 3 is a sectional view through an end assembly of the support assembly shown in FIG. 2 so as to show an elevational view of the retainer member of that embodiment;

FIG. 4 is a cross-sectional view along the 4—4 of FIG. 3;

FIG. 5 is a perspective view of a portion of the support assembly shown in FIG. 2 in an initial feed-through orientation;

FIG. 6 is a perspective view of the type shown in FIG. 5 that illustrates a subsequent infeed position;

FIG. 7 is a perspective view showing a step subsequent to FIGS. 5 and 6 and in which the support assembly has been fed through the eye;

FIG. 8 is a perspective view showing the device in its retaining position and after the step shown in FIG. 7;

FIG. 9 is a detail view showing use of the support assembly as a safety cable;

FIG. 10 is a detail view showing use of the support assembly as a safety cable for a pivotally mounted bulkhead;

FIG. 11 is a detail view showing use of the support assembly as a safety cable for a slidable bulkhead;

FIG. 12 is a detail view showing another application of the support assembly used as a safety cable for a bulkhead;

FIG. 13 is a partial perspective view of a further embodiment of the invention; and FIG. 14 is a cross-sectional view along the line 14—14 of FIG. 13.

DESCRIPTION OF THE PARTICULAR EMBODIMENTS

The support assembly that is generally designated as 11 in the drawings includes inelastic, flexible cables 12 and 13, at least one of which has an end assembly 14. A plurality of securement members 15 are spaced along the cables 12 and 13; they securely join the cables 12 and 13 together at selected locations in order to thereby form an elongated eye 16. One or more elongated eyes 16 may be provided, and each is defined by a selected length of the cable 12, by a selected length of the cable 13, and by two securement members 15 affixed to the cables 12 and 13 in order to thereby define their respective selected lengths.

When desired, a plurality of these elongated eyes 16 may be formed in order to thereby enhance the adjustability of the support assembly 11. Each elongated eye 16 provides a wedging function due in part to the stiffness and inelasticity of the cables 12 and 13, which, together with their having been joined together by the securement members 15, impart a biased condition to the elongated eye 16 that urges the eye into a wedgingly closed orientation. Cables 12 and 13 and elongated eye 16 are sufficiently resilient in a generally transverse direction so that the elongated eye 16 will expand from a biased generally closed orientation to an expanded orientation when an end assembly 14 passes through an elongated eye 16. After the end assembly 14 has passed through an elongated eye 15, the eye will substantially return to its biased, generally closed orientation.

Each cable 12 and 13 is flexible enough to allow for bending it upon itself and looping the entire support assembly 11 about itself and/or about other components, members or devices, while still exhibiting an inelastic condition whereby each cable 12 and 13 generally cannot be compressed or extended in its longitudinal direction. In other words, although the support assembly 11 and each individual cable 12 and 13 is bendable, not one of them is stretchable. Each securement member 15 is rigidly secured in place in order to form the elongated eye 16 in which the cables 12 and 13 and the securement members 15 are secured together in a compact and rigid manner so as to approximate a unitary joint typically having a strength equal to or greater than that of the individual cables 12 and 13. The securement members 15 may take the form of a sleeve, as illustrated in the drawings. Whatever structural features are utilized, the securement members 15 do not allow the cables 12 and 13 to slip or to move relative to each other.

In order to better appreciate the types of forces that can be withstood by the support assemblies of this invention, reference is made to FIG. 1, which shows support assemblies 11 used as safety cables for two different types of railway car bulkhead assemblies (which normally would not be found in the same railway car or the like). Movable bulkhead devices of the type illustrated in FIG. 1 are provided for separating and securing freight so that it will not become damaged during transport and the like.

The left hand portion of FIG. 1 shows a slidable bulkhead assembly 21 having a pair of support assemblies 11 wrapped around an upper portion thereof. The bulkhead assembly 21 is shown butting against and supporting a stack of freight 22. In use, the railway worker slides the bulkhead assembly 21 along rails 23 until the desired location is reached. The actual bulkhead door 24 is suspended from an overhead traveling beam 25. Bulkhead door 24 is secured to the overhead traveling beam 25 by a bracket assembly in a manner such that the bulkhead door 24 can become disconnected from the overhead traveling beam 25. Accordingly, a safety cable such as the support assembly 11 must be provided in order to protect the railway workers and the cargo in the event that the bulkhead door 24 becomes disengaged from the overhead traveling beam 25. FIGS. 9, 11 and 12 illustrate typical applications for use of the support assembly 11 as a safety cable in these types of devices. Different types of bracket assemblies 26, 27 and 28 are illustrated.

Concerning the right hand portion of FIG. 1, a bulkhead assembly 31 of the swivel variety is illustrated. A bulkhead door 32 is suspended from an overhead traveling beam 33 at a single, substantially centrally positioned location. Further details of this type of assembly are found in FIG. 10. With this type of arrangement, the worker can move the bulkhead door 32 in a sliding manner similar to that achieved by the slidable bulkhead assembly 21. In addition, with the bulkhead assembly 31, it is also possible for the worker to rotate the bulkhead door 32 to substantially any position within the railway car or the like. This rotation can be through a full 360 degrees. A swivel bracket assembly 34, which is of known construction, permits this type of movement. It will be appreciated that, as the swivel bracket assembly 34 is put into operation, the support assembly 11 can be subjected to substantial twisting forces as the support assembly 11 wraps around the swivel bracket assembly 34. Unless the worker appreciates that this excessive twisting is being carried out because, for example, the worker has already rotated the assembly through a full circle and then continues to rotate it in the same direction, the safety cable will be subjected to substantial stresses and twisting forces, as will be appreciated when considering the momentum that is imparted by a body as massive as a bulkhead door 32.

It has been experienced that, when safety cables are subjected to these types of conditions, they will tend to fail, thereby rendering them useless. In the context of the present support assembly 11, when used as a safety cable in the manner discussed, tremendous forces and stresses are placed on the end assembly 14 and the elongated eye 16 through which it had been fed. It has been found that the support assembly according to the present invention will withstand these types of forces and will either prevent excessive same-direction rotation of the bulkhead door 32 or will at least indicate to the worker, by the extreme resistance provided by the support assembly according to this invention, that any further rotation in that same direction would be detrimental.

With more particular reference to the interaction of the end assembly 14 with the elongated eye 16, particular reference is made to FIGS. 2 through 8. In addition to a free end length 41 of one of the cables, the end assembly 14 includes a retainer member 42 having an aperture 43 within which end length 41 is positioned. End assembly 14 also includes a rigid one-way member 44 that is secured to the free end length 41. One-way member 44 can have a bullet-like shape such as is illustrated in the drawings, or it can have other shapes which permit the leading end thereof to pass through the elongated eye 16, typically by utilizing a tapering structure such as the conical tip 45. One-way member 44 also has a trailing end that is not capable of easily passing through the eye 16 and that provides a firm support for the retainer member 42, such as the blunt end 46 that is illustrated. If desired, a retainer stop 47 can also be provided in order to control the length of travel of the retainer member 42 away from the one-way member 44.

In order to initially feed the end assembly 14 through the eye 16, the leading end of the rigid one-way member 44 is positioned as illustrated in FIG. 5 so as to begin feeding the one-way member into the eye 16. Before this feeding is completed, the retainer member 42 is angled to its generally longitudinal orientation and, as illustrated in FIG. 6, is fed through the eye 16 along with the rigid one-way member 44. In this embodiment, the retainer member 42 is stepped, and the aperture 43 is in the nature of an elongated slot, with the result that the leading end 48 and the trailing end 49 of the retainer member 42 lie generally along the cable length 41 when the end assembly 14 is in its longitudinally directed orientation. In this manner, the leading end 48 of the retainer member 42, because of the relative thinness thereof and because of its resulting close proximity to the cable length 41, readily passes through the elongated eye 16. Such passage is facilitated by the narrow profile thus provided by the leading edge or end 48 of the retainer member 42 alongside of the cable length 41.

Movement of the end assembly 14 is continued until the entirety of the retainer member 42 has passed through the eye 16 as shown in FIG. 7. Thereafter, the retainer member 42 is moved to an orientation which is generally transverse with respect to the cable length 41, and the end assembly 14 is moved in a retrograde manner until the trailing face of the retainer member 42 engages an external face of the elongated eye 16. This is the secured mode of the support assembly 11, which is illustrated in detail in FIG. 8. Because of the rigid and wedging nature of the elongated eye 16, together with the large surface area of the engaging face of the retainer member 42 and the secure fastening of the one-way member 44 to the cable length 41, this provides an exceedingly strong retaining function to the extent that the support assembly 11 is suitable for use as a safety cable, including a safety cable for a bulkhead assembly, even one that utilizes a pivot bracket.

Even though the support assembly 11 provides an extremely secure support function, it is possible, if desired, to disengage the end assembly 14 from the elongated eye 16 when it is necessary to remove the support assembly 11. This is accomplished by providing some slack between the retainer member 42 and the eye 16 so that the retainer member 42 can be moved to a longitudinal orientation. In this instance, the longitudinal orientation should be such that the leading end 48 of the retainer member 42 buts against, or generally rests on, or is at least closely spaced from, the one-way member 44. Then the trailing end 49 of the retainer member 42 is fed into the eye 16, after which the rest of the retainer member 42 is fed through the eye. Because of the close proximity or overlapping of the leading end 48 of the retainer member 42 with respect to the blunt end 46 of the one-way member 44, the retainer member 42 facilitates passage of the blunt end 46 into the eye 16 and thus the passage of the entire one-way member 44 through the elongated eye 16 in order to disengage the end assembly 14 from the elongated eye 16.

Another embodiment of the invention is shown in FIGS. 13 and 14. An end assembly 14' is illustrated. This end assembly is substantially the same as the end assembly 14, except for the retainer member 42'. Retainer member 42' has an offset 51 at the leading portion of the retainer member 42'. An oppositely directed offset 52 is provided at the trailing end portion of the retainer member 42'. When the retainer member 42' is in its longitudinal orientation, the offsets 51, 52 lie along the cable length 41 so as to give the retainer member 42' a generally shallow profile for feeding through the elongated eye 16. Generally speaking, retainer member 42' is more difficult to pass through the elongated eye 16 than is the retainer member 42, which provides a more wedge-like leading edge and trailing edge in order to assist in prying open the elongated eye 16.

Preferably the entire support assembly 11 is made of metal in order to provide an especially strong and durable device. Other materials could be utilized provided they bring with them the physical properties needed to allow the support assembly 11 to be bent upon itself while providing the strength and rigidity characteristic of the elongated eye 16 as discussed herein. Preferably, the cables 12 and 13 are constructed of braided galvanized steel strands of the type generally referred to as aircraft cable. The securement members 15 may be made of relatively heavy gauge material such as aluminum tubing or other metal that is malleable enough to form the needed rigid joints while being strong enough to maintain the rigidity of the joint during use of the support assembly 11. One-way member 44 is also preferably made of galvanized steel or the like, and it is permanently secured to the cable length 41 by any suitable means of combinations thereof, such as welding, force fitting and/or crimping.

It will be understood that the embodiments of the present invention which have been described are illustrative of some of the applications of the principles of the present invention. Numerous modifications may be made by those skilled in the art without departing from the true spirit and scope of the invention.

We claim:

1. A bulkhead assembly comprising:
   a bulkhead door suspended from an overhead traveling beam through a bracket assembly; and
   a safety cable generally encircling a component of the bulkhead door and a component of the overhead traveling beam, wherein said safety cable includes:
   a plurality of elongated cables;
   a plurality of securement members spaced along and rigidly attached to said cables;
   a stiff, elongated eye formed from the combination of said cables and said spaced apart securement members;
   said cables being sufficiently resilient such that said elongated eye will expand and move back in a direction generally transverse to the length of the support assembly, said cables of the elongated eye being biased toward a generally closed orientation to provide wedging means for receiving an end assembly of the support assembly;
   said end assembly including a rigid one-way member securely attached onto a length of at least one of said cables, said end assembly further including retainer means for controlling passage of said one-way member through said elongated eye;
   said retainer means being slidably mounted on said cable length, said retainer means being slidable along said cable length up until it engages said rigid one-way member and not therebeyond;
   said retaining means having a generally longitudinal orientation with respect to said cable length for allowing passage thereof through said elongated eye, and said retaining means having a generally transverse orientation with respect to said cable length for preventing passage thereof and of said one-way member through said elongated eye; and
   said retaining means including an aperture having a size smaller than a trailing end of said one-way member so that said one-way member cannot pass through said aperture of the retaining means.

2. A support assembly comprising:
   a plurality of elongated cables;
   a plurality of securement members spaced along and rigidly attached to said cables;
   a stiff, elongated eye formed from the combination of said cables and said spaced apart securement members;
   said cables being sufficiently resilient such that said elongated eye will expand and move back in a direction generally transverse to the length of the support assembly, said cables of the elongated eye being biased toward a generally closed orientation to provide wedging means for receiving an end assembly of the support assembly;
   said end assembly including a rigid one-way member securely attached onto a length of at least one of said cables, said end assembly further including retainer means for controlling passage of said one-way member through said elongated eye;
   said retainer means being slidably mounted on said cable length, said retainer means being slidable along said cable length up until it engages said rigid one-way member and not therebeyond;
   said retaining means having a generally longitudinal orientation with respect to said cable length for allowing passage thereof through said elongated eye, and said retaining means having a generally transverse orientation with respect to said cable length for preventing passage thereof and of said one-way member through said elongated eye; and
   wherein said one-way member has a trailing end that securely engages one face of said retaining means when said retaining means is in its generally transverse orientation, and the retaining means has an opposing face which engages a surface of said elongated eye when said retaining means is in its generally transverse orientation.

3. A support assembly comprising:
   a plurality of elongated cables;
   a plurality of securement members spaced along and rigidly attached to said cables;
   a stiff, elongated eye formed from the combination of said cables and said spaced apart securement members;
   said cables being sufficiently resilient such that said elongated eye will expand and move back in a direction generally transverse to the length of the support assembly, said cables of the elongated eye being biased toward a generally closed orientation to provide wedging means for receiving an end assembly of the support assembly;

said end assembly including a rigid one-way member securely attached onto a length of at least one of said cables, said end assembly further including retainer means for controlling passage of said one-way member through said elongated eye;

said retainer means being slidably mounted on said cable length, said retainer means being slidable along said cable length up until it engages said rigid one-way member and not therebeyond;

said retaining means having a generally longitudinal orientation with respect to said cable length for allowing passage thereof through said elongated eye, and said retaining means having a generally transverse orientation with respect to said cable length for preventing passage thereof and of said one-way member through said elongated eye; and wherein a leading edge of said retaining means wedgingly engages said elongated eye when said retaining means is in its generally longitudinal orientation in order to thereby facilitate opening of said elongated eye to permit passage of the retaining means therethrough in an assembly direction.

4. A support assembly comprising:

a plurality of elongated cables;

a plurality of securement members spaced along and rigidly attached to said cables;

a stiff, elongated eye formed from the combination of said cables and said spaced apart securement members;

said cables being sufficiently resilient such that said elongated eye will expand and move back in a direction generally transverse to the length of the support assembly, said cables of the elongated eye being biased toward a generally closed orientation to provide wedging means for receiving an end assembly of the support assembly;

said end assembly including a rigid one-way member securely attached onto a length of at least one of said cables, said end assembly further including retainer means for controlling passage of said one-way member through said elongated eye;

said retainer means being slidably mounted on said cable length, said retainer means being slidable along said cable length up until it engages said rigid one-way member and not therebeyond;

said retaining means having a generally longitudinal orientation with respect to said cable length for allowing passage thereof through said elongated eye, and said retaining means having a generally transverse orientation with respect to said cable length for preventing passage thereof and of said one-way member through said elongated eye; and wherein a trailing edge of said retaining means wedgingly engages said elongated eye when said retaining means is in its generally longitudinal orientation in order to thereby facilitate opening of said elongated eye to permit passage of the retaining means therethrough and in order to permit passage of a blunt end of said one-way means through said elongated eye, whereby said end assembly can pass through said elongated eye in a retrograde direction that is opposite of the assembly direction.

5. A support assembly comprising:

a plurality of elongated cables;

a plurality of securement members spaced along and rigidly attached to said cables;

a stiff, elongated eye formed from the combination of said cables and said spaced apart securement members;

said cables being sufficiently resilient such that said elongated eye will expand and move back in a direction generally transverse to the length of the support assembly, said cables of the elongated eye being biased toward a generally closed orientation to provide wedging means for receiving an end assembly of the support assembly;

said end assembly including a rigid one-way member securely attached onto a length of at least one of said cables, said end assembly further including retainer means for controlling passage of said one-way member through said elongated eye;

said retainer means being slidably mounted on said cable length, said retainer means being slidable along said cable length up until it engages said rigid one-way member and not therebeyond;

said retaining means having a generally longitudinal orientation with respect to said cable length for allowing passage thereof through said elongated eye, and said retaining means having a generally transverse orientation with respect to said cable length for preventing passage thereof and of said one-way member through said elongated eye; and wherein said retaining means includes an aperture having a size smaller than a trailing end of said one-way member so that said one-way member cannot pass through said aperture of the retaining means.

6. The support assembly according to claim 5, wherein said retaining means has a generally stepped shape including two generally parallel surfaces, and wherein said aperture is an elongated slot extending between said parallel surfaces.

7. A support assembly comprising;

a plurality of elongated cables;

a plurality of securement members spaced along and rigidly attached to said cables;

a stiff, elongated eye formed from the combination of said cables and said spaced apart securement members;

said cables being sufficiently resilient such that said elongated eye will expand and move back in a direction generally transverse to the length of the support assembly, said cables of the elongated eye being biased toward a generally closed orientation to provide wedging means for receiving an end assembly of the support assembly;

said end assembly including a rigid one-way member securely attached onto a length of at least one of said cables, said end assembly further including retainer means for controlling passage of said one-way member through said elongated eye;

said retainer means being slidably mounted on said cable length, said retainer means being slidable along said cable length up until it engages said rigid one-way member and not therebeyond;

said retaining means having a generally longitudinal orientation with respect to said cable length for allowing passage thereof through said elongated eye, and said retaining means having a generally transverse orientation with respect to said cable length for preventing passage thereof and of said one-way member through said elongated eye; and wherein said retaining means includes one surface, another surface generally parallel to said one surface, and a web joining said one surface to said another surface, and wherein an aperture is located in said joining web.

8. A support assembly comprising:
a plurality of elongated cables;
a plurality of securement members spaced along and rigidly attached to said cables;
a stiff, elongated eye formed from the combination of said cables and said spaced apart securement members;
said cables being sufficiently resilient such that said elongated eye will expand and move back in a direction generally transverse to the length of the support assembly, said cables of the elongated eye being biased toward a generally closed orientation to provide wedging means for receiving an end assembly of the support assembly;
said end assembly including a rigid one-way member securely attached onto a length of at least one of said cables, said end assembly further including retainer means for controlling passage of said one-way member through said elongated eye;
said retainer means being slidably mounted on said cable length, said retainer means being slidable along said cable length up until it engages said rigid one-way member and not therebeyond;
said retaining means having a generally longitudinal orientation with respect to said cable length for allowing passage thereof through said elongated eye, and said retaining means having a generally transverse orientation with respect to said cable length for preventing passage thereof and of said one-way member through said elongated eye; and
wherein said retaining means includes one surface that, when said retaining means is in its said longitudinal orientation, lies along said cable length onto which it is slidably mounted.

9. The support assembly according to claim 8, wherein said retaining means includes another surface that, when said retaining means is in its said longitudinal orientation, lies along said cable length in a direction that is generally opposite of said one surface.

10. A support assembly comprising:
a plurality of elongated cables;
a plurality of securement members spaced along and rigidly attached to said cables;
a stiff, elongated eye formed from the combination of said cables and said spaced apart securement members;
said cables being sufficiently resilient such that said elongated eye will expand and move back in a direction generally transverse to the length of the support assembly, said cables of the elongated eye being biased toward a generally closed orientation to provide wedging means for receiving an end assembly of the support assembly;
said end assembly including a rigid one-way member securely attached onto a length of at least one of said cables, said end assembly further including retainer means for controlling passage of said one-way member through said elongated eye;
said retainer means being slidably mounted on said cable length, said retainer means being slidable along said cable length up until it engages said rigid one-way member and not therebeyond;
said retaining means having a generally longitudinal orientation with respect to said cable length for allowing passage thereof through said elongated eye, and said retaining means having a generally transverse orientation with respect to said cable length for preventing passage thereof and of said one-way member through said elongated eye; and
wherein said retaining means includes one indented offset, another oppositely directed indented offset in general alignment with said one indented offset, and an aperture between said indented offsets.

11. A bulkhead assembly comprising:
a bulkhead door suspended from an overhead traveling beam through a bracket assembly; and
a safety cable generally encircling a component of the bulkhead door and a component of the overhead traveling beam, wherein said safety cable includes:
a plurality of elongated cables;
a plurality of securement members spaced along and rigidly attached to said cables;
a stiff, elongated eye formed from the combination of said cables and said spaced apart securement members;
said cables being sufficiently resilient such that said elongated eye will expand and move back in a direction generally transverse to the length of the support assembly, said cables of the elongated eye being biased toward a generally closed orientation to provide wedging means for receiving an end assembly of the support assembly;
said end assembly including a rigid one-way member securely attached onto a length of at least one of said cables, said end assembly further including retainer means for controlling passage of said one-way member through said elongated eye;
said retainer means being slidably mounted on said cable length, said retainer means being slidable along said cable length up until it engages said rigid one-way member and not therebeyond;
said retaining means having a generally longitudinal orientation with respect to said cable length for allowing passage thereof through said elongated eye, and said retaining means having a generally transverse orientation with respect to said cable length for preventing passage thereof and of said one-way member through said elongated eye; and
said one-way member having a trailing end that securely engages one face of said retaining means when said retaining means is in its generally transverse orientation, and the retaining means having an opposing face which engages a surface of said elongated eye when said retaining means is in its generally transverse orientation.

12. An improved support assembly including a plurality of elongated cables; a plurality of securement members spaced along and rigidly attached to said cables; a stiff, elongated eye formed from the combination of said cables and said spaced apart securement members; said cables being sufficiently resilient such that said elongated eye will expand and move back in a direction generally transverse to the length of the support assembly, said cables of the elongated eye being biased toward a generally closed orientation to provide wedging means for receiving a rigid one-way member securely attached to a length of at least one of the cables, wherein the improvement comprises:
an end assembly including the one-way member and retainer means for controlling passage of said one-way member through said elongated eye;
said retaining means being slidably mounted on said cable length, said retaining means being slidable along said cable length up until it engages said one-way member and not therebeyond;

said retaining means having a generally longitudinal orientation with respect to said cable length for allowing passage through said elongated eye, and said retaining means having a generally transverse orientation with respect to said cable length for preventing passage thereof and of said one-way member through said elongated eye; and wherein said one-way member has a trailing end that securely engages one face of said retaining means when said retaining means is in its generally transverse orientation, and the retaining means has an opposing face which engages a surface of said elongated eye when said retaining means is in its generally transverse orientation.

13. An improved support assembly including a plurality of elongated cables; a plurality of securement members spaced along and rigidly attached to said cables; a stiff, elongated eye formed from the combination of said cables and said spaced apart securement members; said cables being sufficiently resilient such that said elongated eye will expand and move back in a direction generally transverse to the length of the support assembly, said cables of the elongated eye being biased toward a generally closed orientation to provide wedging means for receiving a rigid one-way member securely attached to a length of at least one of the cables, wherein the improvement comprises:

an end assembly including the one-way member and retainer means for controlling passage of said one-way member through said elongated eye;

said retaining means being slidably mounted on said cable length, said retaining means being slidable along said cable length up until it engages said one-way member and not therebeyond;

said retaining means having a generally longitudinal orientation with respect to said cable length for allowing passage through said elongated eye, and said retaining means having a generally transverse orientation with respect to said cable length for preventing passage thereof and of said one-way member through said elongated eye; and wherein a leading edge of said retaining means wedgingly engages said elongated eye when said retaining means is in its generally longitudinal orientation in order to thereby facilitate opening of said elongated eye to permit passage of the retaining means therethrough in an assembly direction.

14. An improved support assembly including a plurality of elongated cables; a plurality of securement members spaced along and rigidly attached to said cables; a stiff, elongated eye formed from the combination of said cables and said spaced apart securement members; said cables being sufficiently resilient such that said elongated eye will expand and move back in a direction generally transverse to the length of the support assembly, said cables of the elongated eye being biased toward a generally closed orientation to provide wedging means for receiving a rigid one-way member securely attached to a length of at least one of the cables, wherein the improvement comprises:

an end assembly including the one-way member and retainer means for controlling passage of said one-way member through said elongated eye;

said retaining means being slidably mounted on said cable length, said retaining means being slidable along said cable length up until it engages said one-way member and not therebeyond;

said retaining means having a generally longitudinal orientation with respect to said cable length for allowing passage through said elongated eye, and said retaining means having a generally transverse orientation with respect to said cable length for preventing passage thereof and of said one-way member through said elongated eye; and wherein a trailing edge of said retaining means wedgingly engages said elongated eye when said retaining means is in its generally longitudinal orientation in order to thereby facilitate opening of said elongated eye to permit passage of the retaining means therethrough and in order to permit passage of a blunt end of said one-way means through said elongated eye, whereby said end assembly can pass through said elongated eye in a retrograde direction that is opposite of the assembly direction.

15. An improved support assembly including a plurality of elongated cables; a plurality of securement members spaced along and rigidly attached to said cables; a stiff, elongated eye formed from the combination of said cables and said spaced apart securement members; said cables being sufficiently resilient such that said elongated eye will expand and move back in a direction generally transverse to the length of the support assembly, said cables of the elongated eye being biased toward a generally closed orientation to provide wedging means for receiving a rigid one-way member securely attached to a length of at least one of the cables, wherein the improvement comprises:

an end assembly including the one-way member and retainer means for controlling passage of said one-way member through said elongated eye;

said retaining means being slidably mounted on said cable length, said retaining means being slidable along said cable length up until it engages said one-way member and not therebeyond;

said retaining means having a generally longitudinal orientation with respect to said cable length for allowing passage through said elongated eye, and said retaining means having a generally transverse orientation with respect to said cable length for preventing passage thereof and of said one-way member through said elongated eye; and wherein said retaining means includes one surface, another surface generally parallel to said one surface, and a web joining said one surface to said another surface, and wherein an aperture is located in said joining web.

16. An improved support assembly including a plurality of elongated cables; a plurality of securement members spaced along and rigidly attached to said cables; a stiff, elongated eye formed from the combination of said cables and said spaced apart securement members; said cables being sufficiently resilient such that said elongated eye will expand and move back in a direction generally transverse to the length of the support assembly, said cables of the elongated eye being biased toward a generally closed orientation to provide wedging means for receiving a rigid one-way member securely attached to a length of at least one of the cables, wherein the improvement comprises:

an end assembly including the one-way member and retainer means for controlling passage of said one-way member through said elongated eye;

said retaining means being slidably mounted on said cable length, said retaining means being slidable along said cable length up until it engages said one-way member and not therebeyond;

said retaining means having a generally longitudinal orientation with respect to said cable length for allowing passage through said elongated eye, and said retaining means having a generally transverse orientation with respect to said cable length for preventing passage thereof and of said one-way member through said elongated eye; and wherein said retaining means includes one indented offset, another oppositely directed indented offset in general alignment with said one indented offset, and an aperture between said indented offsets.

17. A safety cable for a bulkhead assembly including a bulkhead door suspended from an overhead traveling beam through a moveable bracket assembly, the safety cable being a support assembly that generally encircles a component of the bulkhead door and a component of the traveling beam, said support assembly comprising:

a plurality of elongated cables;

a plurality of securement members spaced along and rigidly attached to said cables;

a stiff, elongated eye formed from the combination of said cables and said spaced apart securement members;

said cables being sufficiently resilient such that said elongated eye will expand and move back in a direction generally transverse to the length of the support assembly, said cables of the elongated eye being biased toward a generally closed orientation to provide wedging means for receiving an end assembly of the support assembly;

said end assembly including a rigid one-way member securely attached onto a length of at least one of said cables, said end assembly further including retainer means for controlling passage of said one-way member through said elongated eye;

said retainer means being slidable mounted on said cable length, said retainer means being slidable along said cable length up until it engages said rigid one-way member and not therebeyond;

said retaining means having a generally longitudinal orientation with respect to said cable length for allowing passage thereof through said elongated eye, and said retaining means having a generally transverse orientation with respect to said cable length for preventing passage thereof and of said one-way member through said elongated eye.

18. A safety cable for a bulkhead assembly including a bulkhead door slidably suspended from an overhead traveling beam through a bracket assembly, the safety cable being a support assembly that generally encircles a component of the bulkhead door and a component of the traveling beam, said support assembly comprising:

a plurality of elongated cables;

a plurality of securement members spaced along and rigidly attached to said cables;

a stiff, elongated eye formed from the combination of said cables and said spaced apart securement members;

said cables being sufficiently resilient such that said elongated eye will expand and move back in a direction generally transverse to the length of the support assembly, said cables of the elongated eye being biased toward a generally closed orientation to provide wedging means for receiving an end assembly of the support assembly;

said end assembly including a rigid one-way member securely attached onto a length of at least one of said cables, said end assembly further including retainer means for controlling passage of said one-way member through said elongated eye;

said retainer means being slidably mounted on said cable length, said retainer means being slidable along said cable length up until it engages said rigid one-way member and not therebeyond;

said retaining means having a generally longitudinal orientation with respect to said cable length for allowing passage thereof through said elongated eye, and said retaining means having a generally transverse orientation with respect to said cable length for preventing passage thereof and of said one-way member through said elongated eye.

19. A safety cable for a bulkhead assembly including a bulkhead door pivotally suspended from an overhead traveling beam through a bracket assembly, the safety cable being a support assembly that generally encircles a component of the bulkhead door and a component of the traveling beam, said support assembly comprising:

a plurality of elongated cables;

a plurality of securement members spaced along and rigidly attached to said cables;

a stiff, elongated eye formed from the combination of said cables and said spaced apart securement members;

said cables being sufficiently resilient such that said elongated eye will expand and move back in a direction generally transverse to the length of the support assembly, said cables of the elongated eye being biased toward a generally closed orientation to provide wedging means for receiving an end assembly of the support assembly;

said end assembly including a rigid one-way member securely attached onto a length of at least one of said cables, said end assembly further including retainer means for controlling passage of said one-way member through said elongated eye;

said retainer means being slidably mounted on said cable length, said retainer means being slidable along said cable length up until it engages said rigid one-way member and not therebeyond;

said retaining means having a generally longitudinal orientation with respect to said cable length for allowing passage thereof through said elongated eye, and said retaining means having a generally transverse orientation with respect to said cable length for preventing passage thereof and of said one-way member through said elongated eye.

* * * * *